United States Patent [19]
Kanegsberg et al.

[11] Patent Number: 5,442,442
[45] Date of Patent: Aug. 15, 1995

[54] RING LASER GYROSCOPE SCALE FACTOR ERROR CONTROL APPARATUS AND METHOD CONTROL APPARATUS AND METHOD

[75] Inventors: Edward Kanegsberg, Pacific Palisades; Steven C. Gillespie; John P. Rahn, both of Canoga Park, all of Calif.

[73] Assignee: Litton Systems, Inc., Beverly Hills, Calif.

[21] Appl. No.: 114,481

[22] Filed: Oct. 28, 1987

[51] Int. Cl.⁶ .......................... G01B 8/02; H01S 3/083
[52] U.S. Cl. ..................................... 356/350; 372/94
[58] Field of Search ......................... 356/350; 372/94

[56] References Cited

U.S. PATENT DOCUMENTS

| | | |
|---|---|---|
| 3,373,650 | 3/1968 | Killpatrick . |
| 3,395,270 | 7/1968 | Speller ............................ 235/150.25 |
| 3,411,849 | 11/1968 | Aronowitz ............................ 356/28 |
| 3,464,657 | 9/1969 | Bullard ................................ 248/20 |
| 3,467,472 | 9/1969 | Killpatrick ........................... 356/106 |
| 3,503,005 | 3/1970 | Mocker ............................... 331/94.5 |
| 3,512,890 | 5/1970 | McLaughlin ........................ 356/106 |
| 3,627,422 | 12/1971 | Chodorow ........................... 356/106 |
| 3,697,887 | 10/1972 | Lee et al. ........................... 331/94.5 |
| 3,743,969 | 7/1973 | Hutchings .......................... 332/7.51 |
| 3,807,866 | 4/1974 | Zingery . |
| 3,854,819 | 12/1974 | Andringa ........................... 356/106 |
| 4,013,365 | 3/1977 | Vali et al. ........................... 356/106 |
| 4,039,260 | 8/1977 | Redman ............................. 356/106 |
| 4,115,004 | 9/1978 | Hutchings et al. ................. 356/106 |
| 4,248,534 | 2/1981 | Elbert ................................. 356/350 |
| 4,267,478 | 5/1981 | Ljung et al. ........................ 310/315 |
| 4,274,742 | 6/1981 | Lustig ................................ 356/350 |
| 4,274,832 | 6/1981 | Sanders et al. ..................... 331/94.5 |
| 4,280,766 | 7/1981 | Goss et al. ......................... 356/350 |
| 4,295,710 | 10/1981 | Heinz ................................. 350/310 |
| 4,309,107 | 1/1982 | McNair et al. ..................... 356/106 |
| 4,314,174 | 2/1982 | Wing et al. ........................ 310/315 |
| 4,321,557 | 3/1982 | McNair .............................. 372/33 |

(List continued on next page.)

FOREIGN PATENT DOCUMENTS 2271542 12/1973 France ........................ G01C 19/00
2749157 11/1978 Germany .
1237663 5/1968 United Kingdom ........ G01C 19/00

OTHER PUBLICATIONS

Coccoli, "An Overview Of Laser Gyros", 12th Joint Services Data Exchange for Inertial Systems, Norfolk, Va. 1978.
Menegozzi et al., "Theory Of A Ring Laser", 1973, Physical Review, vol. 8, No. 4, pp. 2103–2125.
Kilpatrick, "The Laser Gyro", Oct. 1967, IEEE Spectrum, pp. 44–55.
Aronowitz et al. "Positive Scale Factor Correction in the Laser Gyro", *IEEE Journal of Quantum Electronics*, vol. QE-13, No. 5 May 1977, pp. 338–343.
Hammons et al. "Mechanically Dithered RLG at the Quantum Limit", 1982 *IEEE NAECON*, pp. 388–392.

*Primary Examiner*—Stephen C. Buczinski
*Attorney, Agent, or Firm*—Lynn & Lynn

[57] ABSTRACT

The intensity and frequency variation due to retroscatter in a ring laser gyroscope are determined and used to correct the gyro scale factor. The orthogonal types of scatter due to dielectric variation and due to height variation, which lead to common mode phase delays of 0 and $\pi/2$ respectively are taken into account in calculating the correction to the scale factor. The scale factor errors are determined in terms of observable quantities. Scale factor error control is accomplished by extracting a portion of both of the two counterpropagating light beams and measuring their respective intensities, creating intensity modulation indices representative of the sum and difference intensities, using closed loop control of the real-time difference between the intensities of the beam in the ring laser gyro to reduce scale factor variation using push-pull mirror control of at least two mirrors. The residual error after push-pull mirror control minimization is output for use by a navigation system computer.

29 Claims, 3 Drawing Sheets

U.S. PATENT DOCUMENTS

| | | | |
|---|---|---|---|
| 4,349,183 | 9/1982 | Wirt et al. | 267/160 |
| 4,383,763 | 5/1983 | Hutchings et al. | 356/350 |
| 4,392,229 | 7/1983 | Hostetler | 372/94 |
| 4,422,762 | 12/1983 | Hutchings et al. | 356/350 |
| 4,436,423 | 3/1984 | Kumar et al. | 356/350 |
| 4,473,297 | 9/1984 | Simpson et al. | 356/350 |
| 4,491,413 | 1/1985 | Rashleigh | 356/350 |
| 4,526,469 | 7/1985 | Egli et al. | 356/350 |
| 4,529,311 | 7/1985 | Morgan et al. | 356/350 |
| 4,530,097 | 7/1985 | Stokes et al. | 372/6 |
| 4,551,021 | 11/1985 | Callaghan et al. | 356/350 |
| 4,556,319 | 12/1985 | Gauert et al. | 356/350 |
| 4,569,593 | 2/1986 | Auch et al. | 356/350 |
| 4,605,307 | 8/1986 | Lin | 356/350 |
| 4,606,637 | 8/1986 | Geen | 356/350 |
| 4,637,723 | 1/1987 | Egli et al. | 356/350 |
| 4,641,970 | 2/1987 | Gustafson et al. | 356/350 |
| 4,648,716 | 3/1987 | Egli | 356/350 |
| 4,657,392 | 4/1987 | Egli | 356/350 |
| 4,669,881 | 6/1987 | Kay | 356/350 |
| 4,740,085 | 4/1988 | Lim | 356/350 |

RING LASER GYROSCOPE SCALE FACTOR ERROR CONTROL APPARATUS AND METHOD CONTROL APPARATUS AND METHOD

BACKGROUND OF THE INVENTION

This invention relates generally to rotation sensors and particularly to ring laser gyroscope rotation sensors. Still more particularly, this invention relates to apparatus and methods for stabilizing the frequency of light produced in a ring laser.

A ring laser gyroscope employs the Sagnac effect to detect rotation. Two counterpropagating light beams in a closed loop will have transit times that differ in direct proportion to the rotation rate of the loop about an axis perpendicular to the plane of the loop. There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured. The cavity length must be precisely controlled to provide stability in the lasing frequency. A stable frequency is required to provide the desired accuracy in measuring rotations.

A ring laser gyroscope has a sensor axis that passes through the closed paths traversed by the counterpropagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling in the direction opposite to the rotation decreases.

Ring laser gyroscopes may be classified as passive or active, depending upon whether the lasing, or gain medium is external or internal to the cavity. In the active ring laser gyroscope the cavity defined by the closed optical path becomes an oscillator, and output beams from the two directions beat together to give a beat frequency that is a measure of the rotation rate. The oscillator approach means that the frequency filtering properties of the cavity resonator are narrowed by many orders of magnitude below the passive cavity and give very precise rotation sensing potential. To date the major ring laser gyroscope rotation sensor effort has been put into the active ring laser. Presently all commercially available optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates, the frequency difference between the beams disappears. This input rotation rate is called the lock-in threshold. The range of rotation rates over which lock-in occurs is the deadband of the ring laser gyroscope.

Lock-in is believed to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has long been observed and understood in conventional electronic oscillators.

Upon reversal of the sign of the frequency difference between the two beams, there is a tendency for the beams to lock-in since at some point the frequency difference is zero. Since the output of the ring laser gyroscope is derived from the frequency difference, an error accumulates in the output angle. The periods in which the two beams are locked in are usually very short in duration; thus, the error is very small. However, since the error is cumulative, in time the error can become appreciable in precision navigation systems. This error is a major contributor to random walk or random drift.

In addition to causing erroneous rotation rate information to be output from a ring laser gyroscope, lock-in causes standing waves to appear on the mirror surfaces. These standing waves may create a grating of high and low absorption regions, which create localized losses that increase the coupling between the beams and the lock-in. The mirrors may be permanently distorted by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance the effective use of ring laser gyroscopes in such systems.

There are several known approaches to solving the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering.

In one implementation of the RLG, lock-in is largely subdued by placing a sinusoidal plus random mechanical rotational dither of about 200 arc seconds amplitude and at a rate of a few hundred Hertz on the input axis of the RLG. This greatly reduces the scale factor nonlinearity but does not completely eliminate it.. The present invention seeks to minimize scale factor variations and nonlinearities by controlling the scatter and by providing a discriminant for correction of scale factor error.

Basically, there are two mirror scatterer types: that due to surface roughness or height variation, H, which induces a common mode phase shift of 90 degrees, $\pi/2$ radians, and that due to dielectric variations, D, which induces a phase shift of 0 degrees. These 2 scattering sources also have asymmetrical phase shifts which result in the clockwise (cw) traveling scattered field appearing as the complex conjugate of the counter-clockwise (ccw) scattered field.

Previous methods of scale factor variation reduction involved reducing scatter and increasing dither amplitude. These have distinct limitations in terms of cost and mechanical complexity. The present invention attempts to reduce scale factor nonlinearity by an ensemble average of a factor of 4 and may reduce the variations by a much larger factor, all for a moderate cost and moderate increase in complexity.

SUMMARY OF THE INVENTION

In reducing the scale factor error in a ring laser gyroscope this invention concentrates on computing the intensity and frequency variation due to retroscatter in the ring laser gyro. The invention incorporates the resonator leg lengths and the mirror scatter asymmetry into the phasor addition of the scatter from RLG mirrors. This invention also takes into account the two orthogonal types of scatter, either that due to dielectric variation or that due to height variation, which lead to common mode phase shifts of 0 and $\pi/2$ respectively. The lockin rate and scale factor errors are determined in terms of experimentally observable quantities.

The apparatus of the present invention comprises a scale factor error control system for a ring laser gyroscope that includes a frame having a cavity therein for guiding a pair of counterpropagating light beams and two cavity length control mirror mounted to the frame. The apparatus includes means for extracting a portion of both of the two counterpropagating light beams and measuring their respective intensities, means for creating maximum intensity modulation indices representative of the sum and difference intensities, means for providing signal processing and arithmetic logic functions, means for using closed loop control of the real-time difference between the intensities of the beam in the ring laser gyro to reduce scale factor variation, and means for minimizing the difference between light beam intensities using push-pull mirror control of at least two mirrors.

The present invention may also comprise means for producing a signal indicative of the intensity of the first counterpropagating light wave and means for producing a signal indicative of the intensity of the second counterpropagating light wave. The present invention may also include means for amplifying the AC component of the signal produced by a first photodetector, means for amplifying the AC component of the signal produced by a second photodetector, means for amplifying the DC component of the signal produced by the first photodetector means, means for amplifying the DC component of the signal produced by the second photodetector, means for dividing the first amplified AC component by the first amplified DC component to form a first ratio, and means for dividing the second amplified AC component by the second amplified DC component to form a second ratio.

The apparatus of the present invention preferably comprises means for determining the difference between the first ratio and the second ratio and means for summing the first ratio with the second ratio. The apparatus may include means for dual demodulation of the difference of the two ratios using signals from the first and second photodetector means as reference signals, and means for dual demodulation of the sum of the two ratios using the signals from the first and second photodetectors as reference signals.

The present invention includes means for producing a signal indicative of the rotation rate of the ring laser gyroscope, means for producing a signal indicative of the rotation rate of a light beam propagating within a ring laser gyroscope in the counter clockwise direction, means for producing a signal indicative of the rotation rate of a light beam propagating within a ring laser gyroscope in the clockwise direction, means for computing an analog quantity involving the sums and differences of AC to DC ratios, and means for generating a scale factor error correction for output to the system computer to be subtracted out of the scale factor error used therein.

The apparatus of the present invention includes means for combining the outputs of the first and second photodetector means, and means for using the difference between the intensities of the counterpropagating light beams and the combined output to reduce scale factor error and maintain constant cavity length.

The present invention includes means for producing an electrical signal indicative of the displacement of a mirror away from its point of minimum scale factor error, means for connecting the indicative signal to a first actuator to move the mirror into a location providing minimum scale factor error, and means for connecting the electrical signal to a second actuator to move a second mirror into a location providing minimum scale factor error.

The method of the present invention includes the steps of providing scale factor error control for a ring laser gyroscope that includes a frame having a cavity therein for guiding a pair of counterpropagating light beams and two cavity length control mirror mounted to the frame. The method includes the steps of extracting a portion of both of the two counterpropagating light beams and measuring their respective intensities, creating maximum intensity modulation indices representative of the sum and difference intensities, providing signal processing and arithmetic logic functions, using closed loop control of the real-time difference between the intensities of the beam in the ring laser gyro to reduce scale factor variation, and minimizing the difference between light beam intensities using push-pull mirror control of at least two mirrors.

The present invention may also comprise the steps of producing a signal indicative of the intensity of the first counterpropagating light wave and producing a signal indicative of the intensity of the second counterpropagating light wave. The present invention may further include the steps of amplifying the AC component of the signal produced by a first photodetector, amplifying the AC component of the signal produced by a second photodetector, amplifying the DC component of the signal produced by the first photodetector means, amplifying the DC component of the signal produced by the second photodetector, dividing the first amplified AC component by the first amplified DC component to form a first ratio, and dividing the second amplified AC component by the second amplified DC component to form a second ratio. The method of the invention comprises the steps of determining the difference between the first ratio and the second ratio and summing the first ratio with the second ratio.

The method of the present invention includes the steps of providing dual demodulation of the output of the difference of the two ratios using signals from the first and second photodetector means as reference signals, and dual demodulation of the sum of the two ratios using the signals from the first and second photodetector means as reference signals.

The method of the present invention further comprises the steps of producing a signal indicative of the rotation rate of the ring laser gyroscope, producing a signal indicative of the rotation rate of a light beam propagating within a ring laser gyroscope in the counter clockwise direction, producing a signal indicative of the rotation rate of a light beam propagating within a ring laser gyroscope in the clockwise direction, computing an analog quantity involving the sums and differences of the AC to DC ratios, and generating a scale factor error correction for output to the system computer to be subtracted out of the scale factor error used therein.

The present invention comprises the steps of combining the outputs of the first and second photodetector means and using the difference between the intensities of the counterpropagating light beams and the combined output to reduce scale factor error and maintain constant cavity length.

The present invention includes the steps of producing an electrical signal indicative of the displacement of a mirror away from its point of minimum scale factor error, connecting the indicative signal to a first piezoelectric unit to move a first mirror into a location providing minimum scale factor error, and connecting the indicative electrical signal to a second piezoelectric unit to move a second mirror into a location providing minimum scale factor error.

DESCRIPTION OF THE PREFERRED EMBODIMENTS

Figure 1:
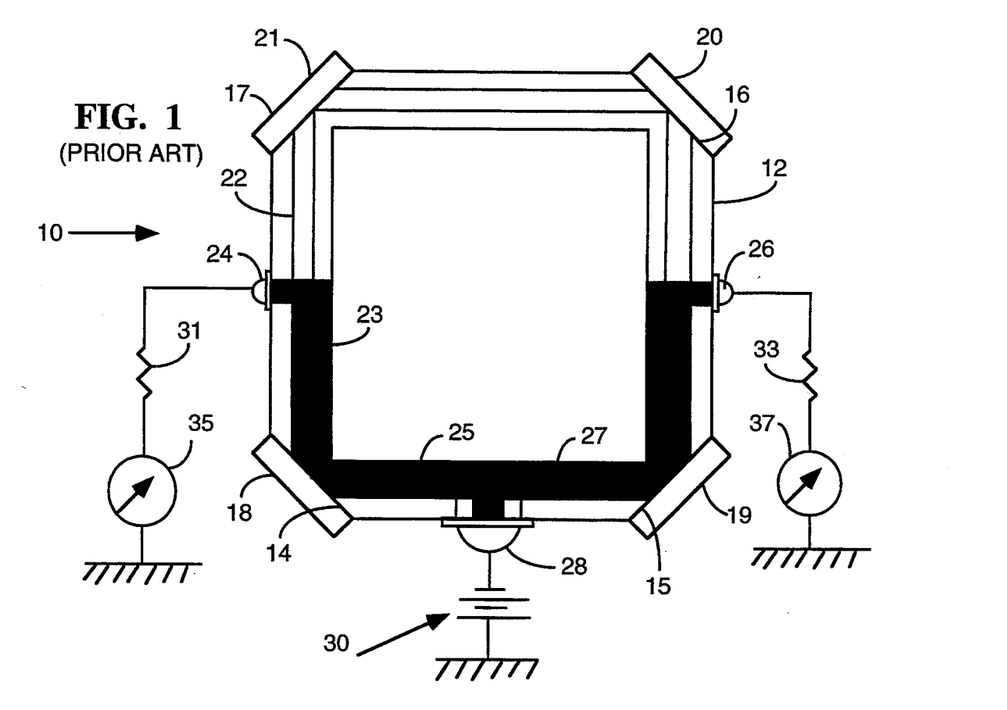
FIG. 1 is a perspective view of a ring laser gyroscope.

Referring to FIG. 1, a ring laser gyroscope 10 includes a frame 12 that may have a polygonal shape with the corners cut off to form four mounting faces 14–17. A plurality of mirrors 18–21 are mounted on the mounting faces 14–17, respectively. A cavity 22 is formed in the frame 12 to form a path around the frame 12 between the mirrors 18–21.

A lasing medium 23 is positioned in the cavity 22 to produce counterpropagating light beams therein represented by the arrows 25 and 27 in the lasing medium 23. The lasing medium 23 is typically a mixture of helium and neon confined to the cavity 22. Energy may be delivered to the lasing medium 23 by a pair of power supplies 35 and 37 which apply voltage between a pair of anodes 24 and 26 and to a cathode 28. Other structures may be used for the ring laser gyroscope 10. The basic description of the ring laser gyroscope 10 is presented by way of example and not for limitation of the present invention to a particular ring laser gyroscope structure.

Figure 3:
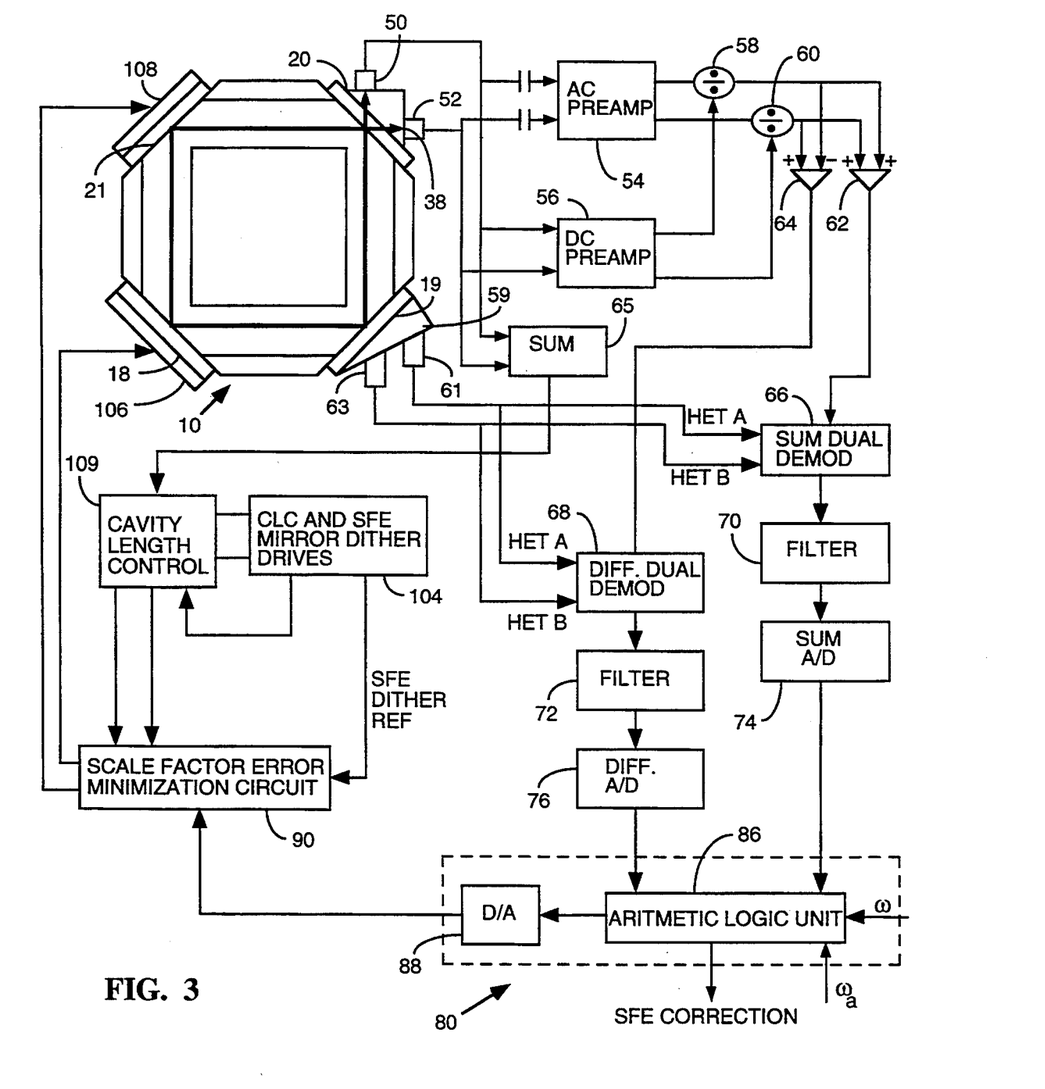
FIG. 3 schematically illustrates the apparatus of the present invention for scale factor error control of the ring laser gyroscope of FIG. 1.

Referring to FIGS. 1 and 3, one of the mirrors, for example the mirror 20 is partly transmissive so that a portion of each beam exits the mirror 20. The two counterpropagating beams undergo phase shifts in circulating around the cavity 22 as the cavity 22 rotates about its sensor axis. These phase shifts may be viewed as changes in the frequencies of the two beams. The difference between the frequencies of the two counterpropagating beams is indicative of the rotation rate of the cavity 22 about its sensor axis. Since the cavity 22 acts as a resonant cavity to the two beams, the frequency of each beam is sharply defined.

FIG. 3 illustrates apparatus according to this invention for providing scale factor error correction and minimization. Referring to FIGS. 1 and 3 the mirror 20 is only partly reflective, and it allows a portion of the laser light to be transmitted out of the ring laser cavity 22. Referring to FIG. 3, light travels to a first photodetector 50 and a second photodetector 52. The first photodetector 50 is positioned in such a way that it detects the intensity of the light beam propagating in the counter clockwise direction. The second photodetector 52 is positioned in such a way that it detects the intensity of the light beam propagating in the clockwise direction.

The first photodetector 50 produces an electrical signal indicative of the intensity of the detected counter clockwise propagating light beam. The second photodetector 52 produces an electrical signal indicative of the intensity of the detected clockwise propagating light beam.

The signals output from these two electrical sources 50 and 52 are fed to several locations in the circuit shown in FIG. 3. The first is capacitively coupled to an AC preamplifier 54 which separately amplifies the AC components of both the first and the second electric signals.

The electrical beam intensity signals are also connected to a DC preamplifier 56 which separately amplifies the DC component of both the first and second photodetector output signals. The preamplified AC signal from the first photodetector 50 is then divided by the preamplified DC component of the first photodetector output by a first analog divider 58. The preamplified signal from the second photodetector 52 is divided by the DC component of the second photodetector output by a second analog divider 60.

The signal from the first analog divider 58 is added to the signal from the second analog divider 60 in a summing amplifier 62. The difference between the first ratio and the second ratio is determined by the difference amplifier 64. These two signals, the sum signal and difference signal, have the same frequency as the photodetector output signals.

The rate output of the ring laser gyroscope 10 may be obtained by combining the beams in a prism 59 so that they become nearly parallel. The prism 59 is shown attached to the mirror 19 in FIG. 3. The combined beams impinge on a pair of heterodyne photodetectors 61 and 63. The combined beams produce an interference pattern that moves across the heterodyne detectors 61 and 63 as the frame 12 rotates about its sensing axis. The signals output from photodetectors 61 and 63 referred to as HET A and HET B, respectively.

The output from the summing amplifier 62 is fed to a first demodulator 66 which is a dual demodulator described subsequently with reference to FIG. 4. The signal HET A is used as the first reference frequency, and the signal HET B is used as the second reference frequency for demodulating the sum signal. The output of the difference amplifier 64 is also fed to a dual demodulator 68, which is similar to the demodulator 66. The reference signals HET A and HET B are connected to the demodulator 68 in the same arrangement as for the first dual demodulator 66.

Figure 4:
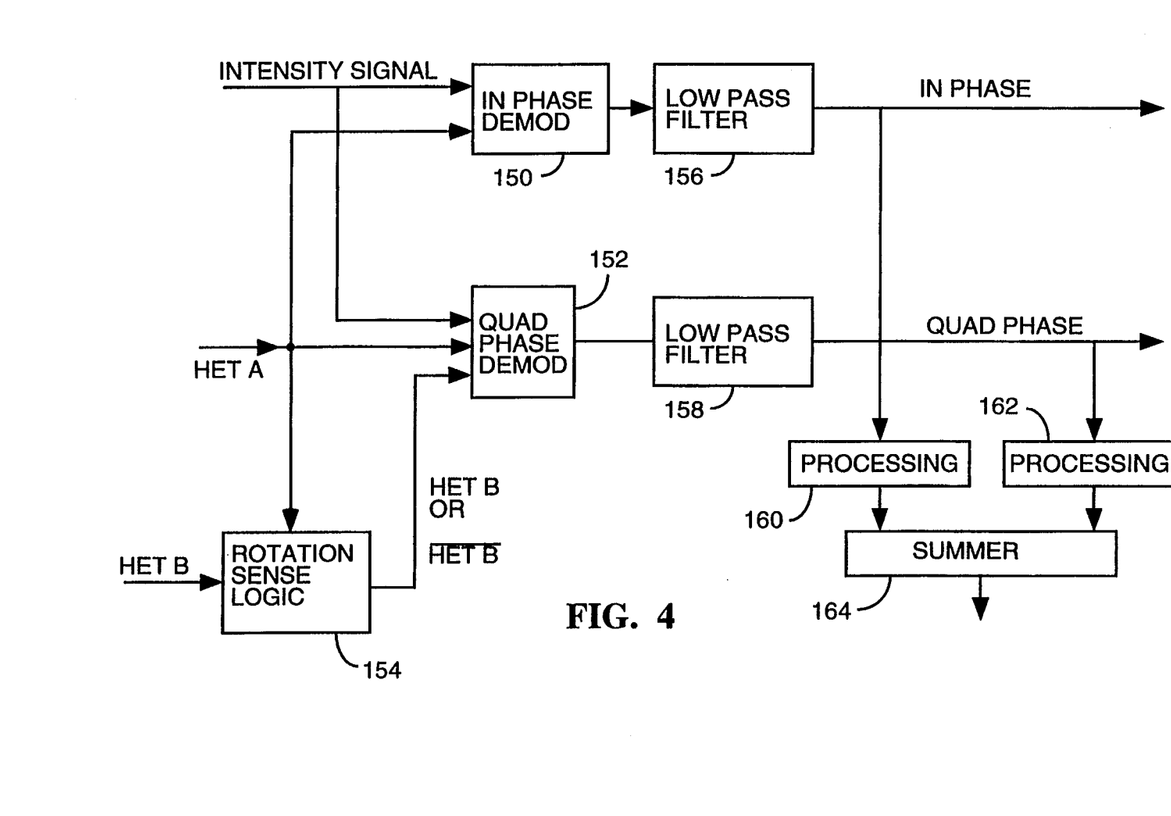
FIG. 4 depicts circuitry that may be included in a dual phase demodulator that may be included in the circuit of FIG. 3.

The structure of the dual demodulator 66 is shown in FIG. 4. The demodulator 68 is identical to the demodulator 66. The part of the amplitude modulation of the beam intensity caused by backscatter has the same frequency as the signals HET A and HET B. Therefore, demodulation with the heterodyne signals (or squares of the same phase and frequency) as a reference enhances the detection of the amplitude modulation caused by backscatter. However, the phase of the intensity signals relative to the heterodyne signals cannot be predicted. The intensity detectors 50 and 52 are on a different corner of the frame 12 from the combining optics 59, and since neither the initially constructed path length nor the path length stability between these corners can be controlled, no assumption as to phase can be made. The dual phase demodulator therefore includes an in-phase demodulator 150 and a quadrature-phase demodulator 152 connected to receive the intensity signal from the summer 62. Since the two demodulators 150 and 152 are in quadrature with one another, the intensity signal will always have a component in phase with at least one of them.

The signal HET A is input to the in-phase demodulator 150. Both of the HET A and HET B signals are input to a rotation sense logic circuit 154, which outputs either the HET B signal or its logic inverse to the quadrature-phase demodulator 152. The output from the rotation sense circuit 154 to the quadrature-phase demodulator depends upon the direction of rotation of the frame 12.

The outputs of the in-phase and quadrature phase demodulators 150 and 152 are input to low pass filters 156 and 158, respectively. The filtered in phase signal may then be input to a processing circuit 160 that determines the absolute value of the signal. The filtered quadrature phase signal may be input to a processing circuit 162 that determines the absolute value of the quadrature phase signal. A summing circuit 164 then adds the outputs of the processing circuits to determine the sum of the absolute values of the filtered signals.

Instead of determining the absolute values of the filtered signals, the processing circuits 160 and 162 may determine the squares of the signals. The output of the summing circuit 164 is then the sum of the squares of the demodulated and filtered in-phase and quadrature phase signals.

Both of the outputs from the dual demodulators 66 and 68 are low pass filtered through low pass filters 70 and 72, respectively. The first and second filtered analog signals are then converted to digital by two analog-to-digital converters 74 and 76. The sum signal is converted through the first analog-to-digital converter 74 and the difference signal is converted through the second analog-to-digital converter converter 76.

The digital output from converter 76 is referred to as $m_1$, which is the modulation index of the difference intensity and is a function of the rotation rate of the ring laser gyroscope. It is a modulated representation of the difference in intensities of the counter propagating light beams in a form which can be manipulated by the system computer 80.

The digital output from converter 74 is referred to as $M_1$, which is the modulation index of the sum intensities and is also a function of ring laser gyroscope rotation rate. It is a modulated representation of the sum of intensities of the counter propagating light beams, in a form which can be manipulated by a system computer 80 that receives the digital signals from the converters 74 and 76.

A quantity $m_1^2 - CM_1^2$ is computed for the minimization of scale factor error by mirror movement. The symbol C represents a quantity that depends upon the input rotation rate as explained subsequently. The residue of this quantity is input to the system computer to be subtracted out of the scale factor. This quantity $m_1^2 - CM_1^2$ is also used to reduce scale factor error by push-pull mirror control of at least 2 mirrors. Push-pull mirror control as used herein means that one mirror is moved out relative to the frame while the other is moved in by an equal distance. The mirrors are moved slightly to reduce $m_1^2 - CM_1^2$. At least two mirrors must be moved so that the overall cavity length of the ring laser gyroscope 10 remains constant as the mirrors are moved.

This push-pull mirror control is accomplished through the following process. The scale factor error mirror and the cavity length control mirror dither drive unit 104 oscillates the mirrors at very small amplitudes in push-pull fashion at a frequency substantially different from the cavity length control mirror drive, which also oscillates the mirrors in push-pull. The scale factor error summing circuit 90 receives both the computed function $m_1^2 - CM_1^2$ from the digital-to-analog converter 88 and a dither reference signal. The circuit 104 synchronously demodulates the function $m_1^2 - CM_1^2$ and the amplified output of this circuit is added in series in push-pull fashion to the cavity length control voltage output in a manner the minimizes $m_1^2 - CM_1^2$ and the scale factor error. The quantity $m_1^2 - cM_1^2$ is computed by the arithmetic logic unit 88.

In a completely analogous manner the cavity length control circuit 109 receives a reference signal from the circuit 104 and the AC part of the intensity sum signal from the summing circuit 65. The circuit 90 synchronously demodulates the intensity sum and applies the amplified demodulated DC output in series an in push-pull fashion with the output from the circuit 104 to the mirrors 18 and 21 so that they move the same distance but in opposite directions relative to the frame.

It has been shown that the positive scale factor error is proportional to $m_1^2$. It has also been shown that one can effect a closed loop minimization of $m_1$ which will minimize this modulation index and correspondingly, the positive scale factor error.

Since the positive scale factor error is often the dominant scale factor nonlinearity in both the small angle dithered and rate biased RLG's, controlling the positive scale factor by closed loop minimization of $m_1$ will minimize both the nonlinearity of the scale factor and the variation of the scale factor error.

Figure 2:
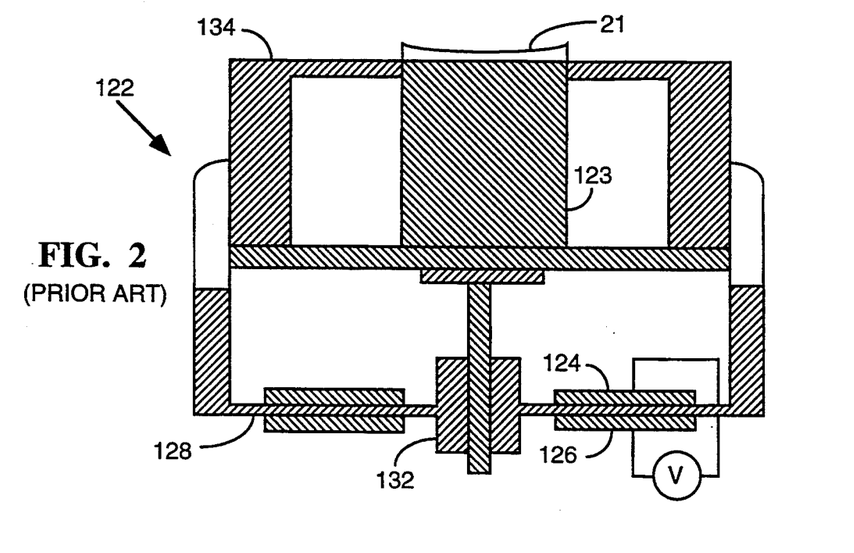
FIG. 2 illustrates apparatus for dithering a mirror in the ring laser gyroscope of FIG. 1.

FIG. 2 shows a movable mirror and an actuator 122 for dithering the mirrors 18 and 21 and for providing cavity length control. The mirror 21, for example, is constrained to translation and is mounted on a post 123. The periphery of the mirror 21 is sufficiently thin that it will flex to permit the center of the mirror to move through a distance adequate to adjust the cavity length to its optimum value. The actuator 122 is mounted to a frame 134 to translate the post 123. Cavity length control is accomplished by applying a voltage to the mirror actuator, which preferably includes a pair of piezoelectric plates 124 and 126 mounted on opposite sides of a thin membrane 128. The voltage causes one of the piezoelectric plates to contract while the other expands, which moves the membrane 128, and consequently the mirror 21, in or out with respect to the cavity 22. The structure of the movable mirror 21 and the actuator 122 are described in U.S. Pat. No. 4,383,763 issued May 17, 1983 to Hutchings et al. The disclosure of that patent is hereby incorporated by reference into this disclosure.

THEORY OF OPERATION

This following description of the operation of the invention concentrates on computing the intensity and frequency variation due to retroscatter in the ring laser gyro. It shows explicitly how to incorporate the resonator leg lengths and the mirror scatter asymmetry into the phasor addition of the scatter from the mirrors. It takes into account the two orthogonal types of scatter, either that due to dielectric variation or that due to height variation, which lead to common mode phase shifts of 0 and $\pi/2$ radians, respectively. It also computes the lockin rate and scale factor errors in terms of experimentally observable quantities. The computations are done to first order in intensity variation which permits us to include some second order frequency pulling terms which are needed for the scale factor corrections.

The retroscatter from mirrors in the RLG induces frequency and intensity variations of the individual modes. When the frequency variation (which is sinusoidal with a frequency equal to the beat frequency) of the two modes of the RLG becomes such that the frequencies are equal for a fraction of a beat period, the frequencies become locked and the RLG can no longer measure rotation. This is the condition called lockin. In a popular implementation of the RLG, it is largely subdued by placing a sinusoidal plus random mechanical rotational dither of about 200 arc seconds amplitude and at a rate of a few hundred Hertz on the input axis of the RLG. This greatly reduces the lockin rate but still results in a significant random drift due mainly to our inability to accurately control the amplitude of the dither. It is generally this residual random drift that is minimized in attempts to reduce the scatter by push-pull control ($\pi$ phasing) of two mirror positions.

The frequency variation (often called frequency pulling) is influenced by the intensity variation as well as by the scatter magnitude, so in order to obtain a complete picture of the lockin and scale factor effects of the scatter, requires solving the intensity equations as well as the frequency equations.

Mirror scattering due to surface roughness or height variation, H, induces a common mode phase delay of 90 degrees or $\pi/2$ radians. Mirror scattering due to dielectric variations, D, induces a phase delay of 0 degrees. These two scattering sources also have asymmetrical phase shifts which result in the clockwise (cw) traveling scattered field appearing as the complex conjugate of the counter-clockwise (ccw) scattered field. It is this asymmetric phase shift that is being varied when mirror $\pi$ phasing is performed. The retroscatter looks like a sinusoidally time varying electromagnetic energy loss per pass, $l$, to the primary waves. It is found that $l_H{}^+ = -l_H{}^-$ and $l_D{}^+ = l_D{}^-$ where the superscripts + and − refer to cw and ccw propagating scattered light.

The intensity equations from Aronowitz et al., "Positive Scale Factor Correction in the Laser Gyro", IEEE J. Quantum Electronics QE-13, 338 (1977) can be written in terms of these scattering losses:

$$\frac{dI^+}{dt} = \frac{c}{L}(\alpha - \beta I^+ - \tau I^- + l^{-+})I^+ \quad (1)$$

$$\frac{dI^-}{dt} = \frac{c}{L}(\alpha - \beta I^- - \tau I^+ + l^{+-})I^- \quad (2)$$

where $\alpha$ is the small signal excess gain per pass, $\beta$ and $\theta$ are the saturation and cross-saturation terms, respectively, and $I^+$ and $I^-$ are the cw and ccw beam (mode) powers respectively.

Rewriting Equations 1 and 2 by taking the sums and differences of the beam powers gives:

$$\frac{dI}{dt} = \frac{c}{L}[\alpha - (\beta + \tau)I + 2l_D I] \quad (3)$$

$$\frac{di}{dt} = \frac{c}{L}[\alpha i - 2\beta i I + 2l_H]I \quad (4)$$

where $l_H$ and $l_D$ are the time dependent loss terms associated with H and D scatter and $$I = \frac{(I^+ + I^-)}{2} \text{ and } i = \frac{(I^+ - I^-)}{2}.$$

These equations may be further simplified by writing the intensity sum as a combination of the time average value of the sum $$I_o = \frac{\alpha}{(\beta + \Theta)}$$

and its time dependent part, which is denoted $I_V$. When this is done, Equations 3 and 4 may be rewritten omitting terms squared in i or $I_V$ since these are very small compared to $I_o{}^2$ and also drop terms in li and $lI_V$ since these are also very small $$di/dt = -\omega_g i + 2l_H \frac{c}{L} I_O \quad (5)$$

$$dI_v/dt = -\omega_a I_v + 2l_D \frac{c}{L} I_O \quad (6)$$

where $$\omega_g = \alpha \frac{\beta - \tau}{\beta + \tau} \frac{c}{L} \quad (7)$$

and $$\omega_a = \alpha \frac{c}{L} \quad (8)$$

Equation (5) is provided and solved in Aronowitz et al., "Positive Scale Factor Correction in the Laser Gyro", IEEE J. Quantum Electronics QE-13, 338 (1970). Equation 6 is of the same type as Equation (5). Since $l_H$ and $l_D$ are periodic at the beat frequency, $\omega$, the solutions when the rotation rate is not too near the lockin rate are:

$$i = i_1 \sin(\omega t + t_1 + \phi_H) \quad (9)$$

and $$I_V = I_1 \cos(\omega t + t_2 + \phi_D) \quad (10)$$

where t stands for time and $t_1$ and $t_2$ are phase delays that will be defined shortly.

It may be shown that:

$$I^+ = \frac{E^-}{E^+}[H\sin(\phi_b + \phi_H) + D\cos(\phi_b + \phi_D)] \quad (10')$$

$$I^- = \frac{E^+}{E^-}[-H\sin(\phi_b + \phi_H) + D\cos(\phi_b + \phi_D)] \quad (10'')$$

where the E's are now the time-dependent magnitudes of the mode fields.

Incorporating Equations (10') and (10'') yields:

$$\frac{i_1}{I_o} = \frac{2H(c/L)}{(\omega^2 + \omega_g^2)^{1/2}} \equiv m_1 \quad (11)$$

$$\frac{I_1}{I_o} = \frac{2D(c/L)}{(\omega^2 + \omega_a^2)^{1/2}} \equiv M_1 \quad (12)$$

where $$\sin(t_1) = \frac{-\omega}{(\omega^2 + \omega_g^2)^{1/2}} \quad (13)$$

and $$\sin(t_2) = \frac{-\omega}{(\omega^2 + \omega_a^2)^{1/2}} \quad (14)$$

where $t_1$ and $t_2$ are the inverse of the delays of the laser mode power response to step changes in the mode loss differences and sums, respectively.

H and D are the fractional magnitudes of the H and D scattered fields and $\phi_H$ and $\phi_D$ are the asymmetry phases of these scattered fields. These phases are varied in synchronism for a given mirror during mirror $\pi$-phasing since both the H and D type scatterers are fixed to that mirror. However, when combined with the scatter from other mirrors the variation with voltage of $\phi_H$ and $\phi_D$ for the four mirror resultant scatter will not generally be in synchronism. It is fairly simple to model this behavior by choosing four single mirror d's and four single mirror h's and varying the asymmetry phases of two of them as is done in $\pi$-phasing operations. Thus a measurement of $\phi_H$ is not generally accurate enough to predict the change in $\phi_D$ and vice versa. In addition, when the magnitudes H and D are varied during $\pi$-phasing operations the minimum H (difference intensity modulation) will occur at one $\pi$ phasing voltage and the minimum D (sum intensity modulation) will generally occur at a completely different voltage. Since these are not generally at the same voltage, the minimum $I^+$ is not expected to occur at the same voltage as the minimum $I^-$. It has been shown that $\beta$ and $\tau$ are nearly equal for our operating parameters (pressure, gain to loss ratio, etc.) so that $\omega_g << \omega_a$. Then at low rotation rates where $\omega < \omega_g$ gives $i_1 >> I_1$ even when H=D and generally it is expected H>>D if our mirror films are non-crystalline (amorphous) and there are no large particles contributing to retroscatter. Thus it will be difficult to measure $I_1$ but, as shall be seen subsequently, its measurement is the only convenient gauge of the magnitude and phase of the main frequency pulling term.

The cw and ccw intensities may now be written in terms of our first order solutions for them:

$$I^+ = I + i = I_0 + I_1 \cos(\omega t + t_2 + \phi_D) + i_1 \sin(\omega t + t_1 + \phi_H) \quad (15)$$

$$I^- = I - i = I_0 + I_1 \cos(\omega t + t_2 + \phi_D) - i_1 \sin(\omega t + t_1 + \phi_H) \quad (16)$$

and these are the final results for the intensity modulation equations to first order.

Equations (15) and (16) permit comparison of the relative apparent phases of $I^+$ and $I^-$. Even for equal H and D (usually H>>D), $i_1$ exceeds $I_1$ by about a factor of 10 due to the large value of $$\frac{\beta + \tau}{\beta - \tau}.$$

Thus twice the average scatter phase, $2\epsilon$, will usually appear to be 180 degrees because the intensity modulations are pulled to this value by the large ratio of $\omega_a/\omega_g$. This is a consequence of mode competition. When the mode losses become unequal as happens during the beat cycle, the mode with the lowest losses quickly (with a time constant of $\omega_g^{-1}$) "grabs" more than its share of atomic gain. This competition is enhanced at higher pressures because the pressure broadening causes hole overlap even with two neon isotopes.

The first order iterative result for the frequency modulation in the RLG are obtained using the same retroscatter phase and magnitude parameters that were used in the previous section, namely H, D, $\phi_H$, and $\phi_D$. It has been shown that:

$$\phi^+ = \tan^{-1}\left(\frac{\frac{E^-}{E^+}[D\sin(\phi_b + \phi_D) - H\cos(\phi_b + \phi_H)]}{1 + \frac{E^-}{E^+}[D\cos(\phi_b + \phi_D) - H\sin(\phi_b + \phi_H)]}\right) \quad (17')$$

$$\phi^- = \quad (17'')$$

$$\tan^{-1}\left(\frac{\frac{E^+}{E^-}[-D\sin(\phi_b + \phi_D) - H\cos(\phi_b + \phi_H)]}{1 + \frac{E^+}{E^-}[D\cos(\phi_b + \phi_D) + H\sin(\phi_b + \phi_H)]}\right)$$

The frequencies of the beams including the retroscatter terms are obtained using the Equations 17' and 17'' by dropping the second order terms in D and H since they are much less than 1:

$$\omega^+ = \omega_o + \frac{\omega_i}{2} + \frac{E^-}{E^+}[+D\sin(\phi_b + \phi_D) - H\cos(\phi_b + \phi_H)]\frac{c}{L} \quad (17a)$$

$$\omega^- = \omega_o - \frac{\omega_i}{2} + \frac{E^+}{E^-}[-D\sin(\phi_b + \phi_D) - H\cos(\phi_b + \phi_H)]\frac{c}{L} \quad (17b)$$

where $\omega_o$ is the empty resonator frequency without rotation and $\omega_i$ is the geometrically defined frequency splitting ($8\pi A\Omega/\lambda L$) of the waves due to inertial rotation rates. $\phi_b$ is the instantaneous phase difference between the two primary waves. The quantity of interest is the difference between $\omega^+$ and $\omega^-$ since this is a quantity which permits us to obtain the intensity versus rotation rate when the beams are mixed on the heterodyne photodetector, which gives the rotation rate and lockin rate. The difference frequency is obtained by subtracting Equation (17b) from (17a) and is:

$$\frac{d\phi_b}{dt} = \omega_i + \frac{c}{L}\left(\frac{I^+ + I^-}{E^+E^-} D\sin(\phi_b + \phi_D) - \frac{I^+ - I^-}{E^+E^-} H\cos(\phi_b + \phi_H)\right) \quad (18)$$

where it is not difficult to show that $E^-E^+ = (I^2 - i^2)^{\frac{1}{2}}$ so that the first intensity term in braces is 2 if terms of order $$\frac{i^2}{I^2}$$

can be neglected. To the same order of approximation, the second intensity term can be written $$\frac{2i}{I} = 2m_1\sin(\omega t + \phi_H + t_1)$$

where $$m_1 = \frac{i_1}{I_o} = \frac{2cH}{L(\omega_i^2 + \omega_g^2)^{1/2}}$$

is the modulation index of the intensity difference. Here rot has been used interchangeably with $\phi_b$ in the small scattering terms only since at the level of iterative approximation given here this will be sufficiently accurate. Then with this notation $$\frac{d\phi_b}{dt} = \quad (19)$$

$$\omega_i + \frac{2c}{L}[D\sin(\omega t + \phi_D) - m_1 H\sin(\omega t + t_1)\cos(\omega t + \phi_H)].$$

The function can be expanded with $t_1$ in its argument and to yield terms which are constant in time and terms which are varying at $\omega$ and $2\omega$:

$$\frac{d\phi_b}{dt} = \omega_i + \quad (20)$$

$$\frac{c}{L}\left(\frac{m_1^2 \omega_i}{(2c/L)} + 2D\sin(\omega t + \phi_D) + Hm_1\sin(2\omega t + 2\phi_H + t_1)\right)$$

The constant term is part of the scale factor error called the "positive scale factor error". The term which oscillates at $\omega$ is usually the main term responsible for lockin since it is first order in the retroscatter coefficient, D. The terms at $2\omega$ can also result in lockin but usually at a lower rate than that due to ones which vary at $\omega$. By modeling the $\omega$ and $2\omega$ terms with many combinations of $\phi_D$ and $\phi_H$ and and D and H, it can be shown that with an error of less than 20 percent even when H is large the lockin rate is given by $$\omega_L = \frac{c}{L}\left(2D + \frac{c}{L}\frac{2H^2}{\omega_g}\right) \quad (21)$$

which explicitly shows the dependence of lockin rate on D and H.

Equation (21) may be simplified using $$m_2 = \frac{i_{1max}}{I_o} \text{ and } M_2 = \frac{I_{1max}}{I_o}$$

which are measurable experimentally as the maximum modulation indices of the difference and sum intensities, respectively which are seen at input rates lower than $\omega_a$ and $\omega_g$, respectively. Also expressed in modulation indices is $$\omega_L = M_2 \omega_a + \frac{m_2^2}{\omega_g^2} = M_2 \omega_a + \frac{M_2^2}{\omega_g^2} \quad (22)$$

Experimentally, $\omega_a$ and $\omega_g$ may be determined as the half width at 0.7 maximum of the $M_1$ and $m_1$ intensity modulation indices as a function of rate as seen from Equations (11) and (12). $M_2$ and $m_2$ are the maximum values of the plots of $M_1$ and $m_1$.

If $$M_2\omega_a >> m_2^2\frac{\omega_g}{2}$$

as is usually the case, then one minimizes $M_2$ to minimize lockin rate. Since $m_2$, $\omega_a$, $M_2$ and $\omega_g$ are conveniently available in a dithered gyro, one can always minimize lockin rate using appropriate control loops to control $M_2$ and $m_2$.

The positive retroscatter scale factor error term is $$S^+ = 2\frac{\left(\frac{cH}{L}\right)^2}{(\omega^2 + \omega_g^2)} \quad (23a)$$

The negative scale factor error term is $$S^- = \frac{\omega_D^2}{2\omega_i^2} \quad (23b)$$

The average rotation rate $<\omega>$ may be calculated as $$<\omega> = \omega_i(1+S^+ - S^-) \quad (23c)$$

The lockin rate term is given in terms of the same experimentally observable parameters defined by Equation (22). The sinusoidal terms on the right side of Equation (20) lead to a net increase of the average beat cycle period and therefore cause a negative scale factor error. This can be seen by direct numerical integration of Equation (20) when $\omega_i$ is considerably greater than the lockin rate. The average value of w, the output fringe rate, is defined as $2\pi$ times the inverse of the time required for the fringes to complete a cycle $$<\omega> = \quad (24)$$

$$\frac{2\pi}{\int_{-\pi}^{\pi} \frac{d\phi}{[\omega_i + \omega_D\sin(\phi) + \omega_H\sin(2\phi - 2\phi_H - 2\phi_D + t_1)]}}$$

where

-continued $$\omega_D = \frac{2cD}{L} \text{ and } \omega_H' = \frac{cm_1H}{L} = \frac{m_1\omega_H}{2} \text{ and where } \omega_H = \frac{2cH}{L}.$$

Since it is assumed that $\omega_D, \omega_H << \omega_i$, the denominator is expanded in a Taylor's series to 4th order in $\omega_D$ and $\omega_H$ so that all of the sine terms are now in the numerator. Note that $$M_1 = \frac{\omega_D}{(\omega_i^2 + \omega_a^2)^{1/2}} \tag{24a}$$

which means that $$\frac{\omega_o^2}{2\omega_i^2} = \frac{M_1^2(\omega_i^2) + \omega_a^2}{2\omega_i^2} = \frac{M_1^2}{2} + \left(1 + \frac{\omega_a^2}{\omega_i^2}\right). \tag{24b}$$

This makes the integral easy to do and results in the expression $$<\omega> \approx \omega_i \left\{1 + \frac{m_1^2}{2} - \frac{1}{2\omega_i^2}\left[\omega_D^2 + \omega_{H'}^2 + \frac{3}{8}\frac{\omega_D^2\omega_{H'}}{\omega_i^2}\sin(2\phi_H - 2\phi_D + t_1)\right]\right\}. \tag{25a}$$

Dropping higher order terms gives:

$$<\omega> \approx \omega_i + \frac{m_1^2\omega_i}{2} = \frac{M_1^2\omega_i}{2}\left(1 + \frac{\omega_a^2}{\omega_i^2}\right) \tag{25b}$$

so that in the expression $m_1^2 - CM_1^2$, the quantity $C$ may be expressed as $$C \approx 1 + \frac{\omega_a^2}{\omega_i}.$$

It is very important that C is a function of $\omega_i$. The arithmetic logic unit 86 has access to $\omega_i$ so that it can form the discriminant which includes both positive and negative scale factor errors.

Numerical integration of Equation (24) and comparison with Equation (25A) shows that the fractional error in computing the scale factor error in Equation (25A) is less than 1 percent for $\omega_D, \omega_H' < 0.1\omega_i$ and less than 6 percent for $\omega_D, \omega_H' < 0.2\omega_i$. What is more important is that the dependence of Equation (25A) on the phase difference between the first and second harmonic scatter pulling terms, $2\phi_H - 2\phi_D + t_1$, tracks the numerical result much more closely than the errors stated above. Equation 25 is a departure from the previous expressions which just used the computed value of the lockin rate as the frequency reducing term and took no account of the relative phasing between the first and second harmonic terms in Equation (20).

Note also that the term with $\frac{3}{8}$ as the numerical factor has $-2$ as its exponent in $\omega_i$, the input rate. This means that this term is not really a scale factor error at all but instead a rate dependent bias since it doesn't change signs when the direction of rotation is reversed. For an undithered 28 cm gyro rotating at $\omega_i = 1°/\text{sec}$ with $\omega_D = 0.1°/\text{sec}$, $\omega_H' = 0.1°/\text{sec}$, one can get as high as $(\frac{3}{8})(0.1/1)^2(0.01/1)3600 = 0.375 \times 10^{-2} = 10^{-2} \times 3600 =$ 0.135°/hr bias due to this term. This bias is expected to be highly variable with temperature since it depends on the phasor-addition-dependent retroscatter magnitudes and is also dependent on the scatter phases, $2\phi_H - 2\phi_D$, in the sine term. However, this bias decreases as $\omega_i^{-2}$ as input rate is increased. The reduction of this bias is another important point (besides scale factor error) in favor of high input rate body dither with large random component.

Since generally $\omega'_H << \omega_D$, $\omega'_H$ may be neglected in the following. Determining the input rate, $\omega_C$, at which the scale factor error is expected to cross zero involves solving Equation (25) for that rate, which yields $$\omega_c = \frac{\omega_g(D/H)}{[1 - (D/H)^2]^{1/2}} \tag{26}$$

where terms of order $D/a$ and $H/a$ have been neglected relative to unity. Thus the rate at which scale factor error changes sign depends critically on the ratio of D to H and will be infinite when $D > H$. This latter result agrees with Reference 1 where the intensity and frequency Equations were solved numerically.

Similarly, obtaining the rate, $\omega_o$ slope, at which the scale factor error has zero slope (and the maximum positive value) requires differentiating Equation (25) with respect to input rate and setting this result equal to zero, which gives $$\omega_{o\,slope} = \omega_g\left(\frac{D}{H-D}\right)^{1/2} \tag{27}$$

The maximum (positive) error is then given by $$S_{max} = \frac{(\omega_H - \omega_D)(\omega_H - 2\omega_D)}{2\omega_g^2} \tag{28}$$

and is usually on the order of 100 ppm on a low loss, low scatter 30 centimeter gyro and occurs in the vicinity of 3 degrees per second, ($\approx 6000$ Hz).

The expected time variation of the heterodyne detector signal, $I_h$, taking into account the time variation of the two field amplitudes due to retroscatter may be expressed as:

$$I_h = (E^+ + E^-)(E^+ + E^-)^* \tag{29}$$
$$= I^+ + I^- + 2(I^2 - i^2)^{1/2}\cos(\phi_b) \tag{30}$$
$$= 2I[1 + \cos(\phi_b)] \tag{31}$$
$$= 2[I_o + I_1\cos(\phi_b + \phi_D + t_2)][1 + \cos(\phi_b)] \tag{32}$$

where terms of order $(i/I)^2$ have been dropped. The value of $\phi_b$ in the second factor of Equation (32) assumes zero differential path in the beam combiner and that the detector is in the center of the combined mode pattern. It has also been assumed that the beam combiner provides equal throughput for both beams. The result indicates that a significant second harmonic will appear on the beat (heterodyne) signal even at high input rates where $\phi_b - \phi_i t$ is a good approximation.

What is claimed is:

1. A scale factor error control system for a ring laser gyroscope that includes a frame having a cavity therein for guiding a pair of counterpropagating light beams and a plurality of cavity length control mirrors mounted to the frame comprising:

means for extracting a portion of each of the two counterpropagating light beams from the cavity;

means for forming a first beam intensity signal indicative of the intensity of the portion of a first one of the two counterpropagating beams extracted from the cavity and a second beam intensity signal indicative of the intensity of the portion of the other one of the two counterpropagating beams extracted from the cavity, each beam intensity signal having an AC component and a DC component;

means for forming intensity modulation indices representative of the sum and difference of the first and second beam intensity signals, including;

means for forming a first ratio by dividing a first signal indicative of the AC component of the first beam intensity signal by a second signal indicative of the DC component of the first beam intensity signal; and     means for forming a second ratio by dividing a second signal indicative of the AC component of the second beam intensity signal by a second signal indicative of the DC component of the second beam intensity signal; and means for minimizing the difference and sum of the first and second beam intensity signals.

2. The scale factor error control system of claim 1, wherein the means for minimizing the difference and sum of the first and second beam intensity signals further includes means for providing push-pull mirror control of at least two of the cavity length control mirrors.

3. The scale factor error control system of claim 1 wherein the extracting means further comprises:

a partially transmissive mirror mounted to the frame to receive the counterpropagating beams thereon so that portions of each beam propagate out of the cavity;

means responsive to a first beam that has propagated from the cavity for producing the first beam intensity signal; and     means responsive to a second beam that has propagated from the cavity for producing the second beam intensity signal.

4. The scale factor control system of claim 1 further comprising:

first photodetector means for producing the first beam intensity signal;

second photodetector means for producing the second beam intensity signal;

means for combining signals output from the first and second photodetector means; and     means for processing signals indicative of the difference between the intensities of the counterpropagating light beams and signals output from the means for combining signals output from the first and second photodetector means to reduce scale factor error and maintain constant cavity length.

5. The scale factor control system of claim 1 wherein the means for minimizing the difference between the differences and sums of the beam intensities comprises:

means for producing an electrical signal indicative of the displacement of a mirror away from its point of minimum scale factor error;

means for applying the electrical signal to a first piezoelectric actuator to move a first mirror into a location providing minimum scale factor error; and     means for applying the electrical signal to a second piezoelectric actuator to move a second mirror into a location providing minimum scale factor error.

6. A scale factor error control system for a ring laser gyroscope that includes a frame having a cavity therein for guiding a pair of counterpropagating light beams and a plurality of cavity length control mirrors mounted to the frame comprising:

means for extracting a portion of each of the two counterpropagating light beams from the cavity, the extracting means including a partially transmissive mirror mounted to the frame to receive the counterpropagating beams thereon so that portions of each beam propagate out of the cavity;

means for measuring a first beam intensity for the portion of a first one of the two counterpropagating beams extracted from the cavity and a second beam intensity for the portion of the other one of the two counterpropagating beams extracted from the cavity;

means for forming intensity modulation indices representative of the sum end difference of the first and second beam intensities, including:

means for producing an amplified AC component of the first beam intensity signal;

means for producing an amplified AC component of the second beam intensity signal;

means for producing an amplified DC component of the first beam intensity signal;

means for producing an amplified DC component of the second beam intensity signal;

means for dividing the amplified AC component of the first beam intensity signal by the amplified DC component of the first beam intensity signal to form a first ratio; and         means for dividing the amplified AC component of the second beam intensity signal by the amplified DC component of the second beam intensity to form a second ratio; and     means for minimizing the differences and sums of the first and second beam intensities.

7. The scale factor control system of claim 6 wherein the means for forming intensity modulation indices comprises:

means for determining the difference between the first ratio and the second ratio; and     means for summing the first ratio and the second ratio.

8. The scale factor error control system of claim 7, wherein the means for forming intensity modulation indices comprises:

means for dual demodulating signals output from the means for determining the difference between the first ratio and the second ratio using signals indicative of the beat frequency between the waves in the cavity as reference signals; and     means for dual demodulating signals output from the means for summing the first ratio and the second ratio using the signals indicative of the beat frequency between the waves in the cavity as reference signals.

9. The scale factor control system of claim 7, further including demodulating means comprised of a pair of dual phase locked loop demodulators.

10. The scale factor error control system of claim 6 wherein the means for forming intensity modulation indices includes:

means for determining the difference between the first ratio and the second ratio;

first low pass filtering means for low pass filtering signals output from the means for determining the difference between the first ratio and the second ratio;

means for summing the first ratio and the second ratio;

second low pass filtering means for low pass filtering signals output from the means for summing the first ratio and the second ratio;

means for converting signals output from the first low pass filtering means from analog to digital; and means for converting signals output from the second low pass filtering means from analog to a digital signal.

11. The scale factor error control system of claim 6 including signal processing and arithmetic-logic means that comprises:

system computing means for computing scale factors;

means for producing a signal indicative of the rotation rate of the ring laser gyroscope;

means for producing a signal indicative of the intensity of a light beam propagating within the ring laser gyroscope in the counter clockwise direction;

means for producing a signal indicative of the intensity of a light beam propagating within a ring laser gyroscope in the clockwise direction; and means for combining the signal indicative of the rotation rate and the signals indicative of the light beam intensities to generate a scale factor error correction for input to the system computing means to be subtracted from the scale factor used therein.

12. A method of scale factor error control for a ring laser gyroscope that includes a frame having a cavity therein for guiding a pair of counterpropagating light beams and two cavity length control mirrors mounted to the frame, comprising the steps of:

extracting a portion of each of the two counterpropagating light beams from the cavity;

forming a first beam intensity signal indicative of the intensity of the portion of a first one of the two counterpropagating beams extracted from the cavity;

forming a second beam intensity signal indicative of the intensity of the portion of the other one of the two counterpropagating beams extracted from the cavity, each beam intensity signal having an AC component and a DC component, forming intensity modulation indices representative of the sum and difference of the first and second beam intensity signals, including the steps of:

forming a first ratio by dividing a first signal indicative of the AC component of the first beam intensity signal by a second signal indicative of the DC component of the first beam intensity signal; and forming a second ratio by dividing a second signal indicative of the AC component of the second beam intensity signal by a second signal indicative of the DC component of the second beam intensity signal; and using closed loop control of the difference between the intensities of the first and second beam intensity signals to minimize the difference and sum of the first and second beam intensity signals to reduce scale factor variation.

13. The method of claim 12 including the step of providing push-pull mirror control of at least two mirrors.

14. The method of claim 12 wherein the extracting step further comprises the steps of:

producing a signal indicative of the intensity of the first extracted light wave; and producing a signal indicative of the intensity of the second extracted light wave.

15. The method of claim 12 wherein the step of forming intensity modulation indices further comprises the steps of:

determining the difference between the first ratio and the second ratio; and summing the first ratio with the second ratio.

16. The method of claim 12, further comprising the steps of:

producing a signal indicative of the rotation rate of the ring laser gyroscope;

producing a signal indicative of the intensity of a light beam propagating within a ring laser gyroscope in the counter clockwise direction;

producing a signal indicative of the intensity of a light beam propagating within a ring laser gyroscope in the clockwise direction;

processing the beam intensity signals to generate scale factor error correction.

17. The method of claim 12, further comprising the steps of:

combining the first and second beam intensity signals; and processing the difference between the intensities of the counterpropagating light beams and the result of combining the first and second beam intensity signals to reduce scale factor error and maintain constant cavity length.

18. The method of claim 12 wherein the step of using closed loop control of the difference between the intensities of the first and second beam intensity signals to minimize the difference between light beam intensities using push-pull mirrors further comprises the steps of:

producing a first electrical signal indicative of the displacement of a first cavity length control mirror away from its point of minimum scale factor error;

producing a second an electrical signal indicative of the displacement of a second cavity length control mirror away from its point of minimum scale factor error;

connecting the first electrical signal to a first piezoelectric actuator to move the first mirror into a location providing minimum scale factor error; and connecting the second electrical signal to a second piezoelectric actuator to move a second mirror into a location providing minimum scale factor error.

19. The method of claim 12, wherein the step of forming intensity modulation indices further comprises the steps of:

dual demodulating signals indicative of the difference between the light beam intensities using signals indicative of the beat frequency between the waves in the cavity as reference signals; and dual demodulating signals indicative of the sum of the light beam intensities using signals indicative of the beat frequency between the waves in the cavity as reference signals.

20. A method of scale factor error control for a ring laser gyroscope that includes a frame having a cavity therein for guiding a pair of counterpropagating light beams and two cavity length control mirrors mounted to the frame, comprising the steps of:

extracting a portion of each of the two counterpropagating light beams;

forming a first beam intensity signal indicative of the intensity of the portion of a first one of the two counterpropagating beams extracted from the cavity;

forming a second beam intensity signal indicative of the intensity of the portion of the other one of the two counterpropagating beams extracted from the cavity, each beam intensity signal having an AC component and a DC component,     forming intensity modulation indices representative of the sum and difference of the first and second beam intensity signals, including the steps of:

forming a first ratio by dividing a first signal indicative of the AC component of the first beam intensity signal by a second signal indicative of the DC component of the first beam intensity signal;

forming a second ratio by dividing a second signal indicative of the AC component of the second beam intensity signal by a second signal indicative of the DC component of the second beam intensity signal;

dual demodulating of signals indicative of the difference between the light beam intensities using signals indicative of the beat frequency between the waves in the cavity as reference signals; and         dual demodulation of signals indicative of the sum of the first and second beam intensity signals using a signal indicative of the beat frequency between the waves in the cavity as a reference signal; and     using closed loop control of the difference between the intensities of the first and second beam intensity signals to minimize the difference and sum of the first and second beam intensity signals to reduce scale factor variation.

21. The method of claim 20 wherein the step of forming intensity modulation indices further includes the steps of:

low pass filtering with a first low pass filter the dual demodulated difference between the first and second beam intensity signals;

low pass filtering with a second low pass filter the dual demodulated sum of the first and second beam intensity signals;

converting signals output from the first low pass filter from analog to digital; and     converting signals output from the second low pass filter from analog to digital.

22. A ring laser gyroscope that includes a frame having a cavity therein for guiding a pair of counterpropagating light beams and a plurality of cavity length control mirrors mounted to the frame comprising:

means for extracting a portion of each of the two counterpropagating light beams from the cavity and forming signals indicative of the intensities of the beams, including:

a partially transmissive mirror mounted to the frame to receive the counterpropagating beams thereon so that portions of each beam propagate out of the cavity;

means responsive to a first beam that has propagated from the cavity for producing a first beam intensity signal; and         means responsive to a second beam that has propagated from the cavity for producing a second beam intensity signal.;

means for forming intensity modulation indices representative of the sum and difference of the first and second beam intensities, including:

means for producing an amplified AC component of the first beam intensity signal;

means for producing an amplified AC component of the second beam intensity signal;

means for producing an amplified DC component of the first beam intensity signal;

means for producing an amplified DC component of the second beam intensity signal;

means for dividing the amplified AC component of the first beam intensity signal by the amplified DC component of the first beam intensity signal to form a first ratio; and         means for dividing the amplified AC component of the second beam intensity signal by the amplified DC component of the second beam intensity to form a second ratio; and     means for forming a first ratio by dividing a first signal indicative of the AC component of the first beam intensity signal by a second signal indicative of the DC component of the first beam intensity signal; and     means for forming a second ratio by dividing a second signal indicative of the AC component of the second beam intensity signal by a second signal indicative of the DC component of the second beam intensity signal; and     means for forming a pair of heterodyne signals that are indicative of the beat frequency of the counterpropagating light beams in the cavity, the heterodyne signals being related to the rotation rate of the frame by a scale factor; and     means for processing the beam intensity signals and the heterodyne signals to provide a scale factor correction signal to be used in determining the rotation rate of the frame from the heterodyne signals.

23. The ring laser gyroscope of claim 22 wherein the means for forming intensity modulation indices comprises:

means for determining the difference between the first ratio and the second ratio; and     means for summing the first ratio and the second ratio.

24. The ring laser gyroscope of claim 23, wherein the means for forming intensity modulation indices comprises:

means for dual demodulating the difference between the first ratio and the second ratio using signals indicative of the beat frequency between the waves in the cavity as reference signals; and     means for dual demodulating the sum of the first ratio and the second ratio using the signals indicative of the beat frequency between the waves in the cavity as reference signals.

25. A method of measuring rotations with a ring laser gyroscope that includes a frame having a cavity therein for guiding a pair of counterpropagating light beams and a plurality of cavity length control mirrors mounted to the frame, comprising the steps of:

extracting a portion of each of the two counterpropagating light beams from the cavity and forming signals indicative of the intensities of the beams by the steps of:
  mounting a partially transmissive mirror to the frame to receive the counterpropagating beams thereon so that portions of each beam propagate out of the cavity;
  producing a first beam intensity signal responsive to a first beam that has propagated from the cavity; and
  producing a second beam intensity signal responsive to a second beam that has propagated from the cavity;
forming intensity modulation indices representative of the sum and difference of the first and second beam intensities, including:
  producing an amplified AC component of the first beam intensity signal;
  producing an amplified AC component of the second beam intensity signal;
  producing an amplified DC component of the first beam intensity signal;
  producing an amplified DC component of the second beam intensity signal;
  dividing the amplified AC component of the first beam intensity signal by the amplified DC component of the first beam intensity signal to form a first ratio; and
    dividing the amplified AC component of the second beam intensity signal by the amplified DC component of the second beam intensity to form a second ratio; and
  forming a first ratio by dividing a first signal indicative of the AC component of the first beam intensity signal by a second signal indicative of the DC component of the first beam intensity signal; and
  forming a second ratio by dividing a second signal indicative of the AC component of the second beam intensity signal by a second signal indicative of the DC component of the second beam intensity signal; and
forming a pair of heterodyne signals that are indicative of the beat frequency of the counterpropagating light beams in the cavity, the heterodyne signals being related to the rotation rate of the frame by a scale factor; and
processing the beam intensity signals and the heterodyne signals to provide a scale factor correction signal to be used in determining the rotation rate of the frame from the heterodyne signals.

26. The method of claim 25 wherein the step of forming intensity modulation indices comprises the steps of:
  determining the difference between the first ratio and the second ratio; and
  summing the first ratio and the second ratio.

27. The method of claim 26, wherein the step of forming intensity modulation indices comprises the steps of:
  forming a signal indicative of the difference between the first and second beam intensity signals;
    dual demodulating the signal indicative of the difference between the light beam intensities using signals indicative of the beat frequency between the waves in the cavity as reference signals; and
  forming a signal indicative of the sum of the first and second beam intensity signals;
    dual demodulating the signal indicative of the sum of the first and second beam intensity signals using a the signals indicative of the beat frequency between the waves in the cavity as a reference signals.

28. The method of claim 27, further including the steps of:
  forming a signal indicative of the sum of the first and second beam intensity signals;
  forming a signal indicative of the difference between the first and second beam intensity signals;
  demodulating the signal sum of the first and second beam intensity signals with a first dual phase locked loop demodulator; and
  demodulating the signal difference of the first and second beam intensity signals with a first dual phase locked loop demodulator.

29. The method of claim 25 including minimizing the difference between the differences and sums of the beam intensities by the steps of:
  producing an electrical signal indicative of the displacement of a mirror away from its point of minimum scale factor error;
  applying the electrical signal to a first piezoelectric actuator to move a first mirror into a location providing minimum scale factor error; and
  applying the electrical signal to a second piezoelectric actuator to move a second mirror into a location providing minimum scale factor error.

* * * * *

UNITED STATES PATENT AND TRADEMARK OFFICE
CERTIFICATE OF CORRECTION

PATENT NO. : 5,442,442
DATED : August 15, 1995
INVENTOR(S) : Kanegsberg et al.

It is certified that error appears in the above-identified patent and that said Letters Patent is hereby corrected as shown below:

On the title page, the item [54] reading "RING LASER GYROSCOPE SCALE FACTOR ERROR CONTROL APPARATUS AND METHOD CONTROL APPARATUS AND METHOD" should read --RING LASER GYROSCOPE SCALE FACTOR ERROR CONTROL APPARATUS AND METHOD--.

Column 1, line 1 reading "RING LASER GYROSCOPE SCALE FACTOR ERROR CONTROL APPARATUS AND METHOD CONTROL APPARATUS AND METHOD" should read --RING LASER GYROSCOPE SCALE FACTOR ERROR CONTROL APPARATUS AND METHOD--.

Signed and Sealed this

First Day of October, 1996

Attest:

BRUCE LEHMAN

Attesting Officer          Commissioner of Patents and Trademarks